(12) United States Patent
Langer et al.

(10) Patent No.: US 11,660,824 B2
(45) Date of Patent: May 30, 2023

(54) APPARATUS AND METHOD FOR ESTABLISHING OR FOR SEPARATING A CONNECTION HAVING MATERIAL CONTINUITY OR HAVING MATERIAL CONTINUITY AND SHAPE MATCHING OF AT LEAST ONE METAL OR CERAMIC COMPONENT AND OF A COMPONENT FORMED FROM OR BY A THERMOPLASTIC POLYMER

(71) Applicants: FRAUNHOFFER-GESELLSCHAFT ZUR FOERDERUNG DER ANGEWANDTEN FORSCHUNG E.V., Munich (DE); TECHNISCHE UNIVERSITAET DRESDEN, Dresden (DE)

(72) Inventors: Maurice Langer, Dresden (DE); Annett Klotzbach, Dresden (DE); Robert Pautzsch, Dresden (DE)

(73) Assignees: FRAUNHOFER-GESELLSCHAFT ZUR FORDERUNG DER ANGEWANDTEN FORSCHUNG E.V., Munich (DE); TECHNISCHE UNIVERSITAT DRESDEN, Dresden (DE)

( * ) Notice: Subject to any disclaimer, the term of this patent is extended or adjusted under 35 U.S.C. 154(b) by 0 days.

(21) Appl. No.: 16/087,955

(22) PCT Filed: Mar. 14, 2017

(86) PCT No.: PCT/EP2017/055934
§ 371 (c)(1),
(2) Date: Sep. 24, 2018

(87) PCT Pub. No.: WO2017/162473
PCT Pub. Date: Sep. 28, 2017

(65) Prior Publication Data
US 2019/0118490 A1    Apr. 25, 2019

(30) Foreign Application Priority Data

Mar. 23, 2016   (DE) .................... 10 2016 204 797.3

(51) Int. Cl.
*B29C 65/46* (2006.01)
*B32B 37/06* (2006.01)
(Continued)

(52) U.S. Cl.
CPC .......... *B29C 65/46* (2013.01); *B29C 65/1629* (2013.01); *B29C 65/1654* (2013.01);
(Continued)

(58) Field of Classification Search
CPC .......... B29C 66/91212; B29C 66/9161; B29C 66/81267; B29C 65/1629; B29C 65/1645;
(Continued)

(56) References Cited

U.S. PATENT DOCUMENTS 3,624,836 A  * 11/1971 Rohdin .................. B29C 66/43
                                                   219/243
5,198,053 A    3/1993 Duncan
(Continued)

FOREIGN PATENT DOCUMENTS

DE    102013001015 T5   11/2014
EP       1036644 A1    9/2000
(Continued)

OTHER PUBLICATIONS

Japanese Office Action, Action dated Dec. 18, 2020 for Japanese Patent Application No. 2018-549519.
Japanese Examination Report.

*Primary Examiner* — Scott W Dodds
(74) *Attorney, Agent, or Firm* — Jacobson Holman PLLC

(57) ABSTRACT

The invention relates to an apparatus and to a method for establishing a connection having material continuity or
(Continued)

Figure 1:
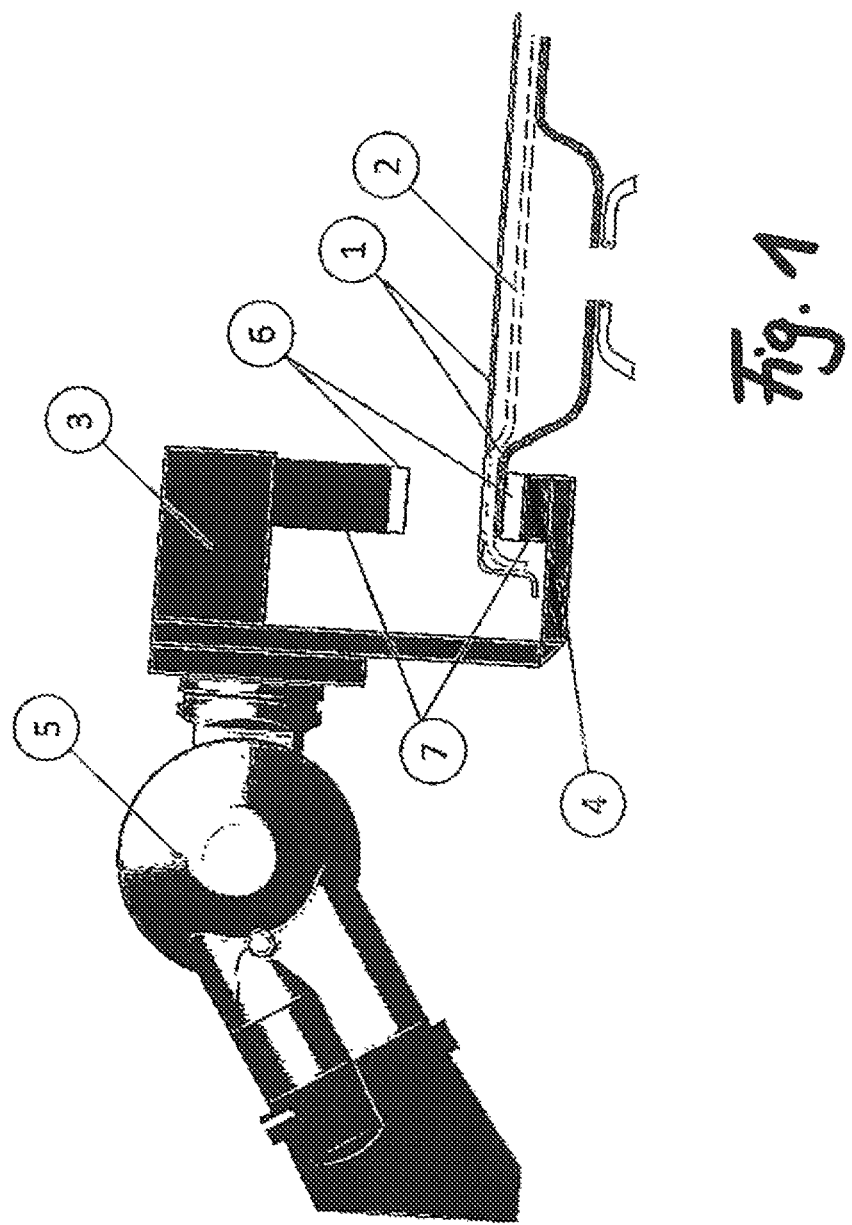

having material continuity and shaping matching or for separating such a connection of at least one metal or ceramic component and of a component formed from or by a thermoplastic polymer in which the components to be joined together can be pressed together by a pressing device having a counterholder and a plunger. A heating device is present at the plunger and/or at the counterholder or acts there. A heating of the at least one metal or ceramic component up to above the softening temperature of the component formed from or by polymer can be achieved with the heating device, with the heating device being having at least one electrical resistance heating element that is covered by an electrically insulating, preferably ceramic, protective film, and/or having at least one laser beam that is directed to the metal component(s) within the joining region, and/or having at least one inductor present at the plunger and/or at the counterholder for the inductive heating of the meal component(s).

3 Claims, 4 Drawing Sheets

(51) Int. Cl.
B29C 65/00 (2006.01)
B29C 65/44 (2006.01)
B29C 65/18 (2006.01)
B29C 65/76 (2006.01)
B29C 65/30 (2006.01)
B29C 65/22 (2006.01)
B29C 65/16 (2006.01)
B29L 31/30 (2006.01)

(52) U.S. Cl.
CPC ............ B29C 65/18 (2013.01); B29C 65/223 (2013.01); B29C 65/30 (2013.01); B29C 65/44 (2013.01); B29C 65/76 (2013.01); B29C 66/1312 (2013.01); B29C 66/22 (2013.01); B29C 66/221 (2013.01); B29C 66/223 (2013.01); B29C 66/24 (2013.01); B29C 66/24221 (2013.01); B29C 66/24225 (2013.01); B29C 66/24245 (2013.01); B29C 66/543 (2013.01); B29C 66/545 (2013.01); B29C 66/721 (2013.01); B29C 66/7392 (2013.01); B29C 66/742 (2013.01); B29C 66/7461 (2013.01); B29C 66/8122 (2013.01); B29C 66/8126 (2013.01); B29C 66/81267 (2013.01); B29C 66/81871 (2013.01); B29C 66/8322 (2013.01); B29C 66/863 (2013.01); B29C 66/9121 (2013.01); B29C 66/9131 (2013.01); B29C 66/9141 (2013.01); B29C 66/9161 (2013.01); B29C 66/91221 (2013.01); B29C 66/9221 (2013.01); B29C 66/961 (2013.01); B29C 65/1664 (2013.01); B29C 66/0342 (2013.01); B29C 66/21 (2013.01); B29C 66/3494 (2013.01); B29C 66/7212 (2013.01); B29C 66/8181 (2013.01); B29C 66/81811 (2013.01); B29C 66/919 (2013.01); B29C 66/91212 (2013.01); B29C 66/91216 (2013.01); B29C 66/91423 (2013.01); B29C 66/91651 (2013.01); B29C 66/91921 (2013.01); B29C 66/91941 (2013.01); B29C 66/929 (2013.01); B29C 66/9231 (2013.01); B29C 66/934 (2013.01); B29C 66/939 (2013.01); B29C 66/949 (2013.01); B29L 2031/30 (2013.01)

(58) Field of Classification Search
CPC . B29C 65/1654; B29C 65/44; B29C 66/8322; B29C 66/916; B29C 65/32; B29C 65/305; B29C 66/91
See application file for complete search history.

(56) References Cited

U.S. PATENT DOCUMENTS

| | | |
|---|---|---|
| 9,005,388 B2 | 4/2015 | Sugiyama et al. |
| 9,889,638 B2 | 2/2018 | Mizuno et al. |
| 2003/0226631 A1* | 12/2003 | Sterud ............... B29C 66/91951 156/64 |
| 2004/0182046 A1* | 9/2004 | Babini .............. B29C 66/72328 53/374.5 |
| 2009/0252978 A1 | 10/2009 | Katayama et al. |
| 2011/0209774 A1 | 9/2011 | Smith |
| 2013/0192751 A1* | 8/2013 | Arai ........................ B32B 37/06 156/272.6 |
| 2016/0052194 A1* | 2/2016 | Nakai ................. B29C 65/7891 156/73.1 |
| 2018/0111327 A1* | 4/2018 | Watanabe ............... B29C 66/21 |

FOREIGN PATENT DOCUMENTS

| | | |
|---|---|---|
| EP | 2724840 A1 | 4/2014 |
| GB | 1427062 A | 3/1976 |
| JP | S62-64528 | 3/1987 |
| JP | 63-145623 | 9/1988 |
| JP | 2011/079949 | 3/2001 |
| JP | 2007-160937 | 6/2007 |
| WO | WO-2009/063515 A1 | 5/2009 |
| WO | WO-2014/123022 A1 | 8/2014 |
| WO | WO-2015/040466 A1 | 3/2015 |
| WO | WO-2017/162473 A1 | 9/2017 |

* cited by examiner

APPARATUS AND METHOD FOR ESTABLISHING OR FOR SEPARATING A CONNECTION HAVING MATERIAL CONTINUITY OR HAVING MATERIAL CONTINUITY AND SHAPE MATCHING OF AT LEAST ONE METAL OR CERAMIC COMPONENT AND OF A COMPONENT FORMED FROM OR BY A THERMOPLASTIC POLYMER

The invention relates to an apparatus and to a method for establishing or for separating a connection having material continuity or having material continuity and shape matching of at least one metal or ceramic component and of a component formed from or by a thermoplastic.

Resistance welding that is typically carried out with the aid of robot-guided welding tongs is a common method to connect body parts to one another in the automotive industry. Two oppositely disposed electrodes are here pressed together at points and a current flow is initiated through the electrically conductive materials that thereupon melt due to the Joule effect, with the pressure during and after the current flow assisting the stable connection. The weld seam is produced when the melted parts solidify again.

The combination of metals and thermoplastics or thermoplastic composite materials increasingly plays a central role in structural lightweight construction since the low weight and the specific high strengths of the composite materials advantageously complement the properties of the metals. It has been a previous problem to develop a method suitable for large-scale industrial use to join these dissimilar materials with process times of <<30 s so that an immediate stress on the connection, e.g. to realize a material flow having connection strengths in the range of adhesively bonded components or thereabove can be realized in the following worksteps. The different physical structure of the materials and their dissimilar thermal coefficients of expansion require special joining processes here.

A previous approach to connect metal parts with thermoplastics or with thermoplastic composite materials in structural lightweight construction comprises joining the materials using a suitable adhesive. The requirement for this is a time-intensive and cost-intensive preparation of the adhesive points, the need to use additional material (adhesive), and the observation of hardening times that are typically in the range of several minutes up to hours.

A further approach includes metal-thermoplastic semifinished products in which metallic plates are alternately layered with a thermoplastic or thermosetting organic sheet and are subsequently connected to one another in a discontinuous joining press at elevated temperatures and at an elevated pressure. This so-called hot pressing is likewise used for already preshaped metal parts in which fiber composite patches are applied.

The in-mold process has also become established for individual components in which the plastic is directly injected onto the metal in an injection molding process or in which a metal part is overmolded. There are, however, substantial limitations in the flexibility of the component geometry and in the material choice here since the plastic has to be processed in an injection molding machine.

Mechanical joining processes such as screwing and riveting effect local cross-section reductions with a disrupted force flow in fiber reinforced plastics (FRPs) and thus substantially degrade the material properties.

Said approaches have previously only been suitable for an industrial use with limitations since the costs and in particular the production times are still very high. A simple integration of the direct thermal joining, that is, without the use of additional material such as adhesive can furthermore only be realized in industrial manufacturing processes when a compact and flexible tool or such an apparatus can be provided.

It is therefore the object of the invention to provide possibilities of being able to establish or separate a secure connection of at least one metal component with a component formed from or by a thermoplastic polymer in a shortened cycle time.

This object is achieved in accordance with the invention by an apparatus having the features described below and by a manufacturing method defined below. Advantageous embodiments and further developments of the invention can be realized using features designated below.

In the apparatus in accordance with the invention for establishing or for separating a connection having material continuity or having material continuity and shape matching of at least one metal or ceramic component and of a component formed from or by a thermoplastic polymer, the components to be joined to one another can be pressed together or pulled apart by a pressing device having a counterholder and a plunger.

A heating device is present at the plunger and/or at the counterholder. It has the effect that at least a partial heating of the at least one metal or ceramic component can be achieved up to above the softening temperature and optionally also beneath the decomposition temperature of the component formed from or by polymer. The decomposition temperature should at least not be exceeded during the joining.

The heating device is configured in the form of at least one of the three following alternatives.

The heating device has at least one electrical resistance heating element that is covered by an electrically insulating protective film, preferably by a ceramic protective film.

At least one laser beam is preferably directed through an element that is transparent for the laser radiation, that is an integral part of the plunger and/or of the counterholder, and onto the metal or ceramic component(s) within the joining region. A plurality of laser beams can, however, also be used that can be directed onto a surface of a metal or ceramic element by an array arrangement of a plurality of laser beam sources that are preferably individually controllable.

It has at least one inductor present at the plunger and/or beside the counterholder for the inductive heating of the metal component(s).

A locally defined heating of the metal or ceramic component(s) should thus thereby be achievable in the joining region by means of the heating device in that a plurality of electrical resistance heating elements are each configured as individually controllable and in so doing in the form of point-shaped, linear, rectangular, or annular electrical resistance heating elements or electrical resistance heating elements of circular ring segment form with which a heating rate can preferably respectively be achieved of more than 500 K/s and an at least preferably almost homogeneous temperature field can be achieved in the boundary surface between the join partners within the join region due to inhomogeneous heat introduction.

At least one of the two possibilities respectively named in the following can be used alone or in addition for this purpose to heat the polymer.

The at least one laser beam can be deflectable and operable in dependence on a temperature measurement device detecting with spatial resolution such that an at least almost homogeneous temperature can be reached in the joining region. The laser beam can, however, also be operated in a controlled manner if the local heating that can be achieved by it in within the joining region has been determined or is known in advance. The temperature can, for example, be measured or determined by a pyrometer or thermographically. A change at the surface of a heated component can also be taken into account here such as is the case, for example, on an occurrence of tempering colors. The recognition of errors on the carrying out of the method is thus also detectable since, for example, temperatures that are too high can occur at a metal or ceramic component if there is no sufficient touching contact to the surface of a component formed by thermoplastic polymer and heat cannot be sufficiently output through heat conduction to this component formed by a thermoplastic polymer.

The at least one inductor can be designed such that it is operable in a movable and/or regulable manner with respect to a metal component so that an at least almost homogeneous temperature can be achieved in the joining region. With a plurality of inductors, they can each be controlled and/or regulated individually.

The invention can, however, also be used for separating such components. The heating of the thermoplastic polymer takes place in the joining region in this process as with a joining with material continuity or with material continuity and shape matching up to a suitable temperature. On a movement of the plunger and the counterholder in which both move away from one another, tensile forces can act at the metal or ceramic components that result in the separation of a previously established connection, said tensile forces acting by means of fixing elements or clamping element that are present on the plunger and on the counterholder and that preferably engage at the metal or ceramic components distributed over the outer periphery.

A cooling device can also be present at the apparatus that can preferably be integrated in the plunger and/or counterholder. A cooling device can be designed as follows:

Cooling of the respective metal or ceramic component by enforced convection via gases that have cooled to room temperature or to considerably below room temperature and that are directed as a flow onto the joining partners;

Cooling by heat conduction over cooling plates that can be activated after the heating process by liquid or gaseous cooling media;

Heat dissipation via the plunger or counterholder.

The cycle time can be further reduced by a cooling since the solidification process of the thermoplastic material can be shortened after the heating.

It can be advantageous for the formation of a connection that is also shape matched that at least one aperture and/or one recess into which softened or melted polymer enters or an elevated portion into which the softened or melted polymer penetrates is present in at least one metal or ceramic component in the joining region and can be used for a shape matched connection. The softened polymer, and optionally even melted polymer, can thus fill up a corresponding cavity by the effect of compressive force of the plunger and the counterholder and in so doing can even fill up one or more undercuts or can engage around an outwardly facing margin of an aperture. An elevated portion can penetrate into the softened polymer and can catch there after the solidification. One or more elevated portions can here also be pressed into the polymer such that it penetrates between a plurality of fibers or fiber layers and thus an even firmer interconnection can be achieved between the metal or the ceramic and the fiber composite.

If the heating of the at least one metal or ceramic component takes place within the joining region, the at least one laser beam should be operated in a regulable manner in dependence on the temperatures in its feed movement direction measured or known with spatial resolution within the joining region at the metal component(s), in dependence on the feed speed of the focus of the laser beam, on the size of the area of the focus, on its power and/or on its pulse rate and pulse length in a pulsed operation of the laser beam so that an at least almost constant temperature can be observed in the joining region of the respective irradiated metal or ceramic component and so that the temperature can be held above the softening temperature and, where possible, also below the decomposition temperature of the polymer during joining. On an influencing of the size of the area of the focus, the laser beam can be focused such that the focal plane is arranged above the surface of the irradiated metal or ceramic component since larger feed movement speeds can thus be realized.

The heating of the metal or ceramic component(s) can also be influenced in all the alternatives of heating devices by the acting compression forces that are applied by the plunger and counterholder since the thermal conduction between the different component materials can be influenced.

An aspect that should also be noted in the heating comprises the temperature increase being influenced such that a homogeneous temperature distribution is observed in the joining region by thermal conduction on the surface of a metal or ceramic component that is in contact with the polymer material. The actually heated surface can have temperature gradients over the heated surface.

On the heating, the properties of the respective polymer play an essential role, which in particular relates to the viscosity which can be reached by the heating and by which a viscous flow behavior is only possible at all. Further influencing variables are the material, in particular the thermal conductivity and the thickness of the metal or ceramic components) and the component geometry that is/are heated by means of the heating device.

The anisotropic thermal conduction in the joining region present due to the component geometry is of particular importance on the heating of the metal partners with a direct irradiation of the rear region of the joining surface. A controlled, spatially adapted thermal input is therefore required to achieve a homogeneous temperature field in the joining region.

A component formed from or by a polymer can be connected at two oppositely disposed sides to a respective metal and/or ceramic component. A heating device should here be present or should act at the plunger and the counterholder. In this case, a laser beam can also be divided into at least two part beams before the incidence on the metal or the ceramic and, with reflective elements, the partial beams can be directed to oppositely disposed surfaces of the two metal components.

The already mentioned deflection of a laser beam can also be achieved by means of pivotable reflective elements, so-called scanner or galvanic mirrors. Both the feed movement direction and the feed speed of the focus can be influenced by the pivot movement of one or more such reflective elements.

On the establishing of a connection having material continuity or having material continuity and shape matching of at least one metal component and of a component formed from or by a thermoplastic polymer, the components to be joined to one another are pressed together by a pressing device having a counterholder and a plunger. Such an apparatus can in principle be similar to the design of spot welding tongs known per se.

A heating of the polymer takes place at least during the pressing together by at least one heating device present at the plunger and/or at the counterholder. The heating of the at least one metal or ceramic component here takes place up to above the softening temperature and, on the joining, below the decomposition temperature of the component formed from or by the polymer.

The cooling takes place after the end of the heating phase (achievement of the desired temperature and holding time in the joining region) so that the polymer solidifies and a shape matching or a material continuity is formed between the thermoplastic polymer and the metal or ceramic material. On a falling below of the consolidation temperature, the pressing together and thus the actual joining process is ended.

The heating device that is formed by at least one electrical resistance heating element that is covered by an electrically insulating and preferably ceramic protective film can here be operated in a controlled or regulated manner in an alternative if, on the one hand, the heating behavior is known and has preferably been determined in advance or if a spatially resolved detection of the temperature within the joining region is carried out on the heating.

In a further alternative in which the heating takes place within the joining region by at least one two-dimensionally deflectable laser beam that is preferably directed onto the metal or ceramic component(s) through an element that is transparent for the laser radiation and that is an integral part of the plunger and/or of the counterholder, an influencing of the deflection movement of the laser beam, of its beam shape and/or of the energy that can be coupled into the material of the metal component in a locally defined manner within the joining region can take place in a regulated or controlled form.

In a third alternative, the required heating is carried out with at least one inductor that is present at the plunger and/or at the counterholder and that is configured for the inductive heating of the metal component(s) and in so doing a regulation or control is performed by which a locally defined heating is achieved within the joining region.

A direct softening (plasticizing) up to a melting of the thermoplastic material or of the thermoplastic material matrix of a preferably preconsolidated semi-finished fiber composite product (so-called organic sheets) takes place in the contact region by thermal conduction. The softened (plasticized) polymer material or even the melted polymer material flows by the application of a joining pressure and can move for the formation of a connection having material continuity and optionally additionally having shape matching into structures (apertures, recesses), optionally with an undercut geometry, that have optionally been previously formed and are formed in a metal component within the joining region and solidifies there so that the polymer can link with material continuity to a preferably bonding layer that can be formed at the surface of a metal or ceramic component.

The achievable process cycle times can thus be shortened to only a few seconds without the use of additional connection elements, which represents a substantial advantage with respect to conventional process solutions such as adhering or adhesively bonding additional connection elements.

To enable the thermal direct joining on the basis of thermal conduction economically in a large-scale industrial use, the following solution paths can be pursued:

1. A highly dynamic ceramic heater that can be configured as single layer or also as multilayer or a laser induced heating of metal joining partners or an inductively excited region can be used as a heat source for the process.
2. A highly dynamic ceramic heater having at least one electrical resistance heating element should be designed such that an inhomogeneous heating can be achieved to achieve a homogeneous temperature field in the joining region by means of very good thermal conduction and a short circuit on a contact and heating of an electrically conductive joining partner can be prevented.
3. A ceramic heater or a laser-transparent element/medium or the coil(s) of an inductor that is/are installed in/at a tool can be pressed together by a directed joining pressure in the desired joining region.
4. The region of a plunger or of a counterholder that has contact with the respective joining partner should be configured such that the surface contours to be joined are mapped, that is, should be contoured in a correspondingly complementary manner.
5. The apparatus or a part of the apparatus that comes into contact with the components to be joined can be configured such that a use can be implemented both manually and with a robot or a linear drive system.
6. The use of preceding adhesion-improving processes (e.g. bonding agents, sandblasting, laser structuring, etc.) in the joining region of the two materials can be carried out before the joining.
7. Elements for the directed cooling of the joining partners can be integrated or present in/at the apparatus and cause a cooling effect of the thermoplastic polymer either on the basis of enforced convection via gases or of directed thermal conduction by actuable cooling plates or heat dissipation via the plunger and the apparatus.

The invention is an apparatus for joining metals with thermoplastics or thermoplastic composite materials on the basis of direct thermal joining by heat conduction. The basic structure of an example of such an apparatus can be seen from FIG. 1. A highly dynamic heating device having a ceramic top layer, alternatively also in combination or singly with the use of laser radiation or at least one inductor, is possible. A heat input within the joining region can be achieved at one side or at both sides at metal or ceramic components. A heating can here take place at a side at a metal or ceramic component and at another metal or ceramic component between which a component is present that is formed from or by a thermoplastic material. The heating can be carried out at both sides using the same heating device or at one side using a heating device and at the oppositely disposed side using a different heating device that are respectively selected from electric resistance heating element(s) (preferably highly dynamic ceramic heaters), a laser beam and/or an inductor.

To prevent an electric short circuit between the highly dynamic ceramic heater layer of at least one electrical resistance heating element and an electrically conductive component surface, coatings having very good thermal conductivity, having electrically insulating properties, and composed of a preferably ceramic material should be applied to the electrical resistance heating element(s) that have similar thermal coefficient of expansion. Hardening thermally conductive pastes, silica films or films of hexagonal boron nitride can be used for such a coating.

In the case of thermally induced heating via laser irradiation, the application of the joining pressure and the coupling of the laser radiation can be achieved by means of a laser transparent element/medium that is arranged at the plunger or counterholder and that has been brought into touching contact with a surface of a metal component. The pressing force effect and the laser beam exertion within the joining region can here be directed directly by the laser transparent element/medium and the laser radiation can be directed through it onto a surface of a metal or ceramic component in the joining region. The metal or ceramic component can here be directly heated and the thermoplastic polymer material can be heated at the rear side by the resulting thermal conduction and a plasticizing of the thermoplastic material can thus be achieved. The laser-based introduction of heat into the metal or ceramic component surface(s) provides the possibility with respect to the conventional heating with respect to heating elements of a spatially locally limited and, where necessary, also graduated temperature profile with integrated pyrometer regulation and high geometrical flexibility. Any desired arrangements of metal and thermoplastic can be implemented by means of electrical induction without any optical accessibility being required.

The following advantages can be achieved with the invention:

Flexible use of the apparatus without geometrical limitation of the components to be joined to one another or to be separated by the use of plungers and counterholders that are in particular adapted geometrically in a correspondingly contoured manner.

Extremely brief process times due to highly dynamic heating and cooling (e.g. highly dynamic ceramic heaters at 7000 K/s and very high temperature gradients of up to 350 K/mm), whereas conventional ceramic heating plates, e.g. composed of silicon nitride or aluminum nitride having heating rates <<200 K/s have a much more sluggish behavior.

Wide selection of materials to be joined or to be separated from one another since only an initial melting is required with sufficient softening above the glass transition temperature ($T_o$) of the thermoplastic polymer or of the thermoplastic matrix.

Use both for prefixing and for a complete joining of components is possible.

With a corresponding stiffness of the components to be joined, the accessibility from only one side is sufficient for establishing a simple overlap connection.

With a suitable surface pretreatment, a bonding of a metal or ceramic component can be realized down to the fiber structure of a thermoplastic composite material and thus higher connection strengths can be achieved than with adhesive bonding since in adhesive bonding an adhesion only takes place at the boundary layer.

Achieving a defined inhomogeneous heating by a homogeneous temperature distribution within the joining region (integrated highly dynamic temperature detection and temperature regulation are possible).

Ceramic electrical resistance heating elements can be manufactured and replaced in a manner adapted to the purpose of use.

The invention will be explained in more detail by way of example in the following.

Figure 2:
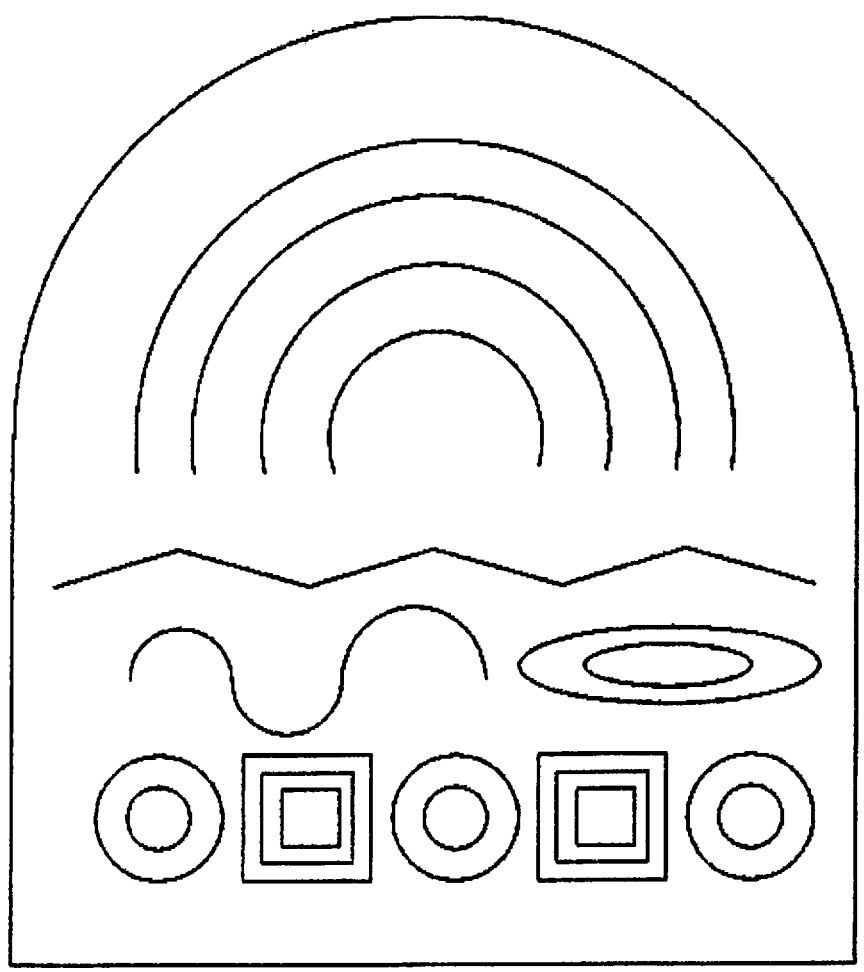
Figure 3:
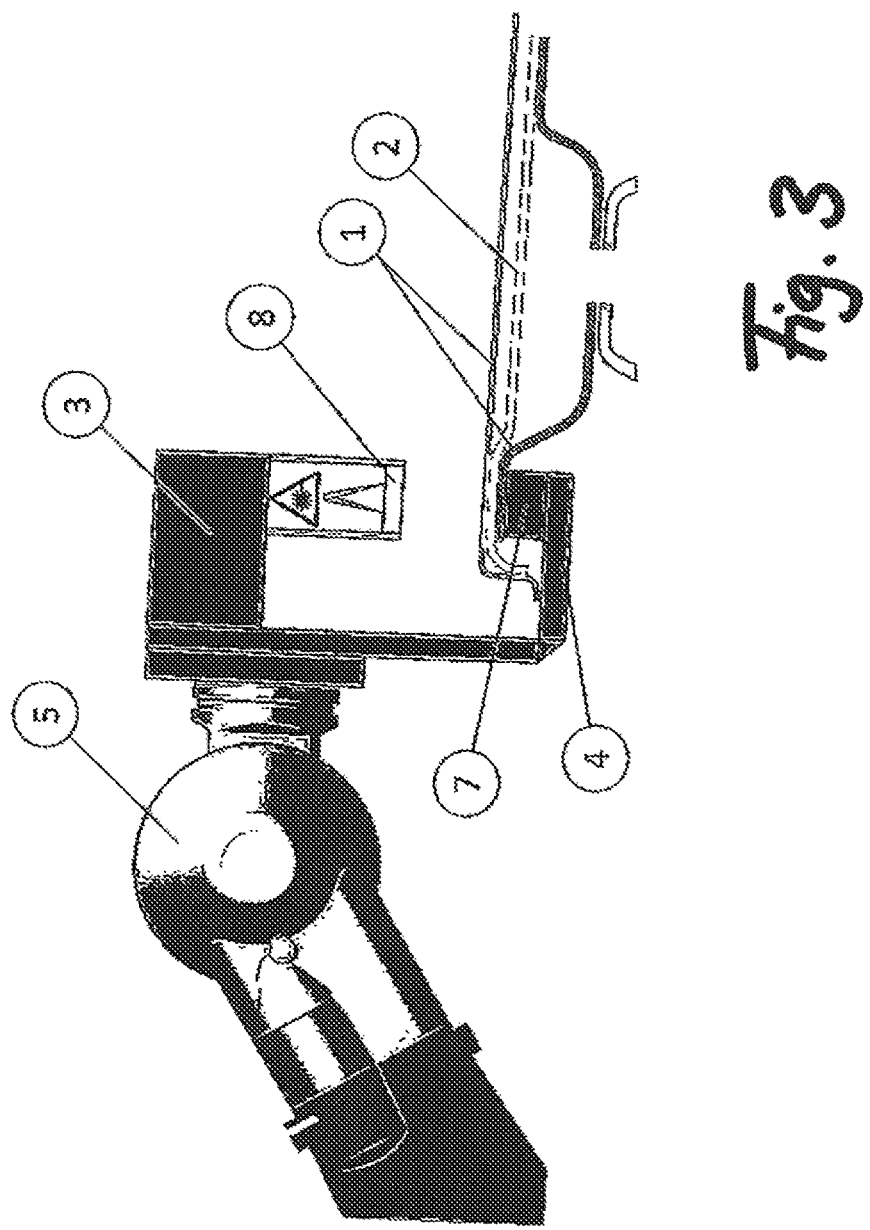
Figure 4:
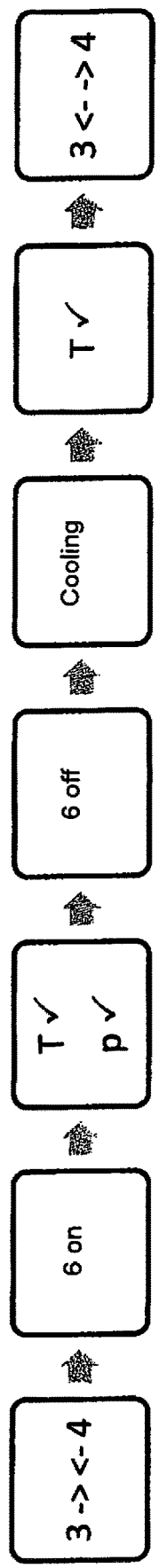

There are shown:

FIG. 1 in schematic form an example of an apparatus in accordance with the invention;

FIG. 2 a view of a heating device with geometrically different electrical resistance heating elements;

FIG. 3 an apparatus in which a heating by means of a laser beam can be achieved; and FIG. 4 a schematic representation of the joining process.

An example of an apparatus is shown in FIG. 1 in which two metal components 1 are to be connected to one another with a component 2 of a fiber composite in a joining region at two mutually opposite surfaces. The fiber composite, for example, comprises glass fiber fabric embedded in a thermoplastic matrix. A plunger 3 and a counterholder 4 that are movable toward one another by means of a drive acting in translation are present at the apparatus. The components 1 and 2 can be positioned between the plunger 3 and the counterholder 4. The apparatus can be correspondingly positioned and aligned by means of an industrial robot 5 for this purpose.

A respective heating device 6 can here be attached to or integrated in the plunger 3 and a counterholder 4 that are brought into touching contact with the metal components 1.

Compressive forces act on the moving toward one another of the plunger 3 and the counterholder 4 that press the components 1 and 2 together. The heating device 6 is activated before the contact or simultaneous with the contact of the components 1 and 2 with the plunger 3 and the counterholder 4 and a heating of the metal components 1 takes place up to above the softening or plasticizing temperature of the thermoplastic polymer within the joining region. The heating can take place up to the reaching or exceeding of the melting temperature of the polymer. No degradation can occur, however.

The polymer of the component 2 is sufficiently heated solely by thermal conduction of the metal components 1 and can thus be plastically deformed, with the deformation being maintained after the cooling and solidifying of the polymer. At least one cooling element 7 can be integrated in or present at the apparatus for the faster cooling. A cooling medium can also be directed into the joining region. It can be a cooled fluid that can be directed to the joining region as a flow.

After the sufficient cooling and solidifying, the plunger 3 and the counterholder 4 can be moved apart.

The plunger 3 and the counter holder 4 can act against one another at a predefinable joining pressure in the range from 0.1 MPa to 20 MPa and can press the components 1 and 2 together in the joining region.

The compressive force effect and/or the heating device can be influenced by means of a force sensor and/or path sensor. A path restriction can thus take place in the moving toward one another of the plunger 3 and the counterholder 4 that ends the movement after reaching a predefinable path. The heating device 6 can, however, also be switched on when a specific path has been covered on which the plunger 3 and the counterholder 4 have approached the component surfaces up to a predefinable value or on which the components 1 and 2 come into touching contact. A switching off of the heating device 6 can take place after recognition of a covered path of the plunger 3 and/or of the counterholder 4 or on a falling blow of a predefinable compression force that acts between the plunger 3 and the counterholder 4, which can be determined using a force measurement sensor.

An electrical resistance heating having a plurality of electrical resistance heating elements such as are shown in a plurality of different examples for this in FIG. 2 can be formed as a heating device 6 at the plunger 3 and/or at the counterholder 4. In this example of a heating device 6, a plurality of electrical resistance heating elements are present as closed rectangular contours having different sizes. In addition, electrical resistance heating elements of annular shape can be present that have varying diameters. Electrical resistance heating elements can, however, also be ellipsoid, linear, optionally with changing direction, meandering, or wavy.

Electrical resistance heating elements arranged next to one another can also be electrically conductively connected to one another. Each of the electrical resistance eating elements is individually controllable and can be regulated in dependence on the temperature. For this purpose, temperature sensors (e.g. thermal elements) can be integrated in the heating device 6 to enable a spatially resolved temperature determination in the joining region. A heating rate of more than 1000 K/s can be achieved with the electrical resistance heating elements.

The electrical resistance heating elements are covered by a thin ceramic film that is electrically non-conductive, as explained in the general part of the description.

If a plunger 3 or a counterholder 4 is not provided with a heating device 6 or, as explained in the following, is provided with a heating device 6 having at least one inductor, its surface should likewise be provided with a non-stick coating that can avoid an adhesion of polymer.

A heating device 6 can, however, also be formed by at least one inductor that can be attached to a plunger 3 and/or to a counterholder 4. At least one inductor can also be integrated in a plunger 3 and/or in a counterholder 4. The inductor(s) should be dimensioned and configured such that a uniform temperature can be observed within the joining region. A plurality of inductors can for this purpose be operated with individual regulation or can be individually switched on and off. Inductors acting in the interior of the joining region can thus be switched on or off before inductors acting in the outer region of the joining region to take the inertia of the thermal conduction into account.

If a temperature increase within the joining region is achieved as shown in FIG. 3 by at least one laser beam at a plunger 3 and/or at a counterholder 4, the laser beam in the joining region should be directed through an element 8 that is transparent for the laser radiation and that is an integral part of the plunger 3 and/or of the counterholder 4 onto the metal component(s) 1 within the joining region. An element 8 transparent for the laser radiation can be formed from a glass having low absorption for the laser radiation.

The focus of the laser beam can be moved over the joining region such that a constant temperature can be observed within the joining region. The feed movement can take place here such that corresponding distances are observed between the individual tracks. The focus should where possible be moved within the joining region at a distance from its outer margins.

A pulsed operation of the laser beam can also be utilized.

The feed speed at which the focus is moved can equally be larger at the center of the joining region than its surface such as should be selected in outer marginal regions of the joining region. Work can therefore be carried out in the outer marginal region of the joining region at a lower feed speed and/or with a larger focus.

The power of the laser radiation source can naturally likewise be regulated.

The initially named laser machining parameters can each be regulated individually, but also two or more of these parameters can be regulated together. The regulation can take place with a spatially resolved temperature measurement within the joining region at the surface of a metal component 1, preferably using a pyrometer or a thermographic temperature determination. In the outer marginal region, work can also take place at the center of the joining region using the useful pulse length of a laser beam operated in a pulsed manner.

The focus of the laser beam can be moved at a feed speed in the range from 0.02 m/s to 30 m/s and can be operated with a power in the range from 100 W to 5000 W, with a pulse length in the range from 1 ms to continuously radiating, and with pulse intervals in the range from 0 to 10 ms. The laser beam can be directed in a focused manner on the surface of a metal component 1 such that a focal surface in the range from 1 mm$^2$ bis 200 mm$^2$ and an intensity in the range from $5*10^2$ W/cm$^2$ to $5*10^6$ W/cm$^2$ are reached.

If a plurality of laser beams from a plurality of laser beam sources are directed onto the surface of a component 1 within the joining region, every individual laser beam can be operated in a correspondingly regulated or controlled manner. In this case, an influencing of the feed speed can be dispensed with and this can be compensated by a corresponding switching on and off or by an operation with changing power of the individual laser beam sources in that heating is carried out in a differentiated, locally changing manner within the joining region.

In all three possible alternatives for the heating, the pressing together of the components 1 and 2 can take place at a maximum joining pressure in the range from 0.1 MPa to 20 MPa, wherein the respective maximum compressive force depend on the softening temperature or transition temperature $T_G$ of the thermoplastic polymer used and/or its flow behavior.

A possible flow in the carrying out of the method is shown schematically in FIG. 4. The plunger 3 and the counterholder 4 are moved toward one another in a first step here.

The heating device 6 is then activated to heat at least one component 1 and/or 2. At the latest on the contact of the plunger 3 and/or of the counterholder 4 with one of the components 1 and/or 2, the temperature T and/or the compressive force p can be determined at the component(s) 1 and/or 2. If the reaching of at least one predefinable threshold value is detected for the temperature T and/or for the compressive force p, the heating device 6 is switched off and a cooling takes place down to a temperature at which the polymer has solidified. After the recognition of this temperature, the plunger 3 and the counterholder 4 can be moved away from one another and the joined workpiece or individual separate parts thereof can be removed.

On a separation, the individual parts can be released from clamping elements or fixing elements that are present at the plunger 3 and at the counterholder 4.

The invention claimed is:

1. An apparatus for establishing or separating a connection having material continuity between a thermoplastic component having softening and decomposition temperatures and at least one metal component, the apparatus comprising:
   a counterholder,
   a plunger opposing the counterholder such that the at least one metal component can be pressed there between in a joining region,
   a sensor for taking spatially resolved temperature measurements within the joining region, and
   a heating device present, or acting, at the plunger, at the counterholder, or at each of the plunger and the counterholder, respectively, wherein the heating device is capable of achieving a homogeneous temperature field within the joining region by taking into account the spatially resolved temperature measurements and adjusting the heating temperature accordingly and heating the at least one metal component within the joining region up to above the softening temperature, and below the decomposition temperature, of the thermoplastic component, wherein the heating device is a laser beam source adjustable to focus a laser beam within the joining region by at least one of:

(i) the laser beam source being configured to move the laser beam in response to the spatially resolved temperature measurements to create the homogeneous temperature field, or (ii) the laser beam having an adjustable focus area wherein the size of the focus area is controllable based on the spatially resolved temperature measurements to create the homogeneous temperature field.

2. The apparatus in accordance with claim 1, further comprising fixing elements or clamping elements present on the plunger and the counterholder, respectively, to engage and release the at least one metal component when present at the plunger and the counterholder.

3. The apparatus in accordance with claim 1, characterized in that the at least one metal component has a feature for a shape matched connection, wherein the feature comprises:

at least one aperture and/or one recess into which softened or melted thermoplastic polymer enters; or an elevation that penetrates into the softened or melted polymer.

* * * * *